(No Model.) 4 Sheets—Sheet 1.
T. W. MATHER.
STATION CALL FOR ELECTRIC CIRCUITS.
No. 288,089. Patented Nov. 6, 1883.
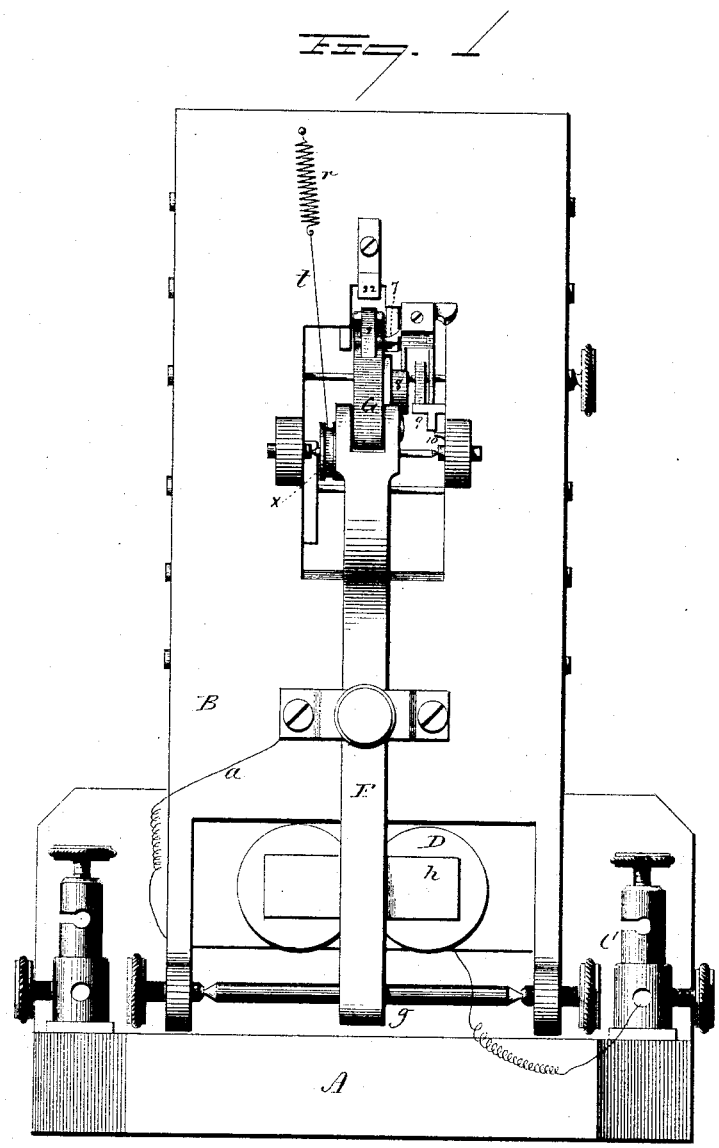

(No Model.)
4 Sheets—Sheet 2.
T. W. MATHER.
STATION CALL FOR ELECTRIC CIRCUITS.
No. 288,089.
Patented Nov. 6, 1883.
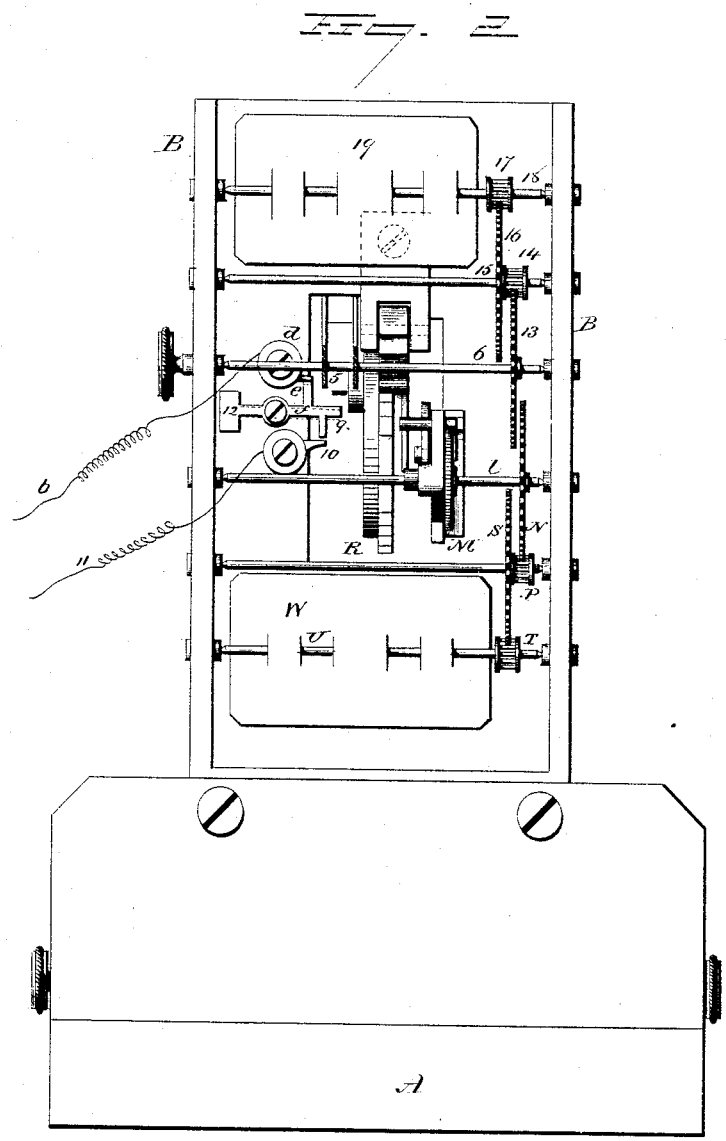

(No Model.) T. W. MATHER. 4 Sheets—Sheet 3.
STATION CALL FOR ELECTRIC CIRCUITS.
No. 288,089. Patented Nov. 6, 1883.
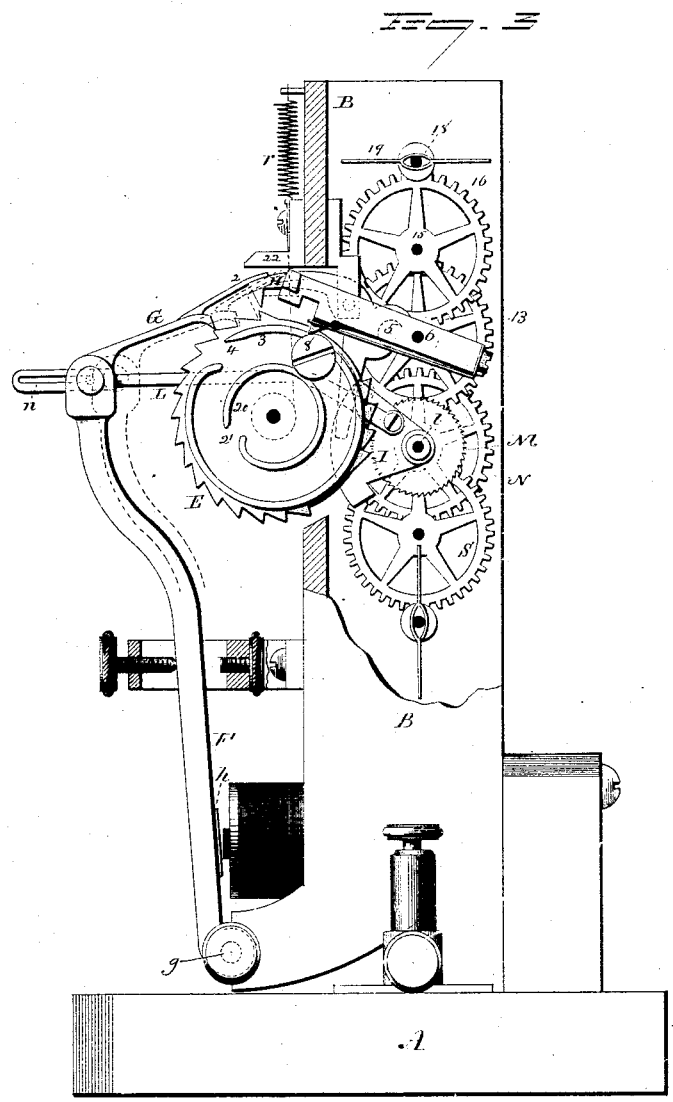

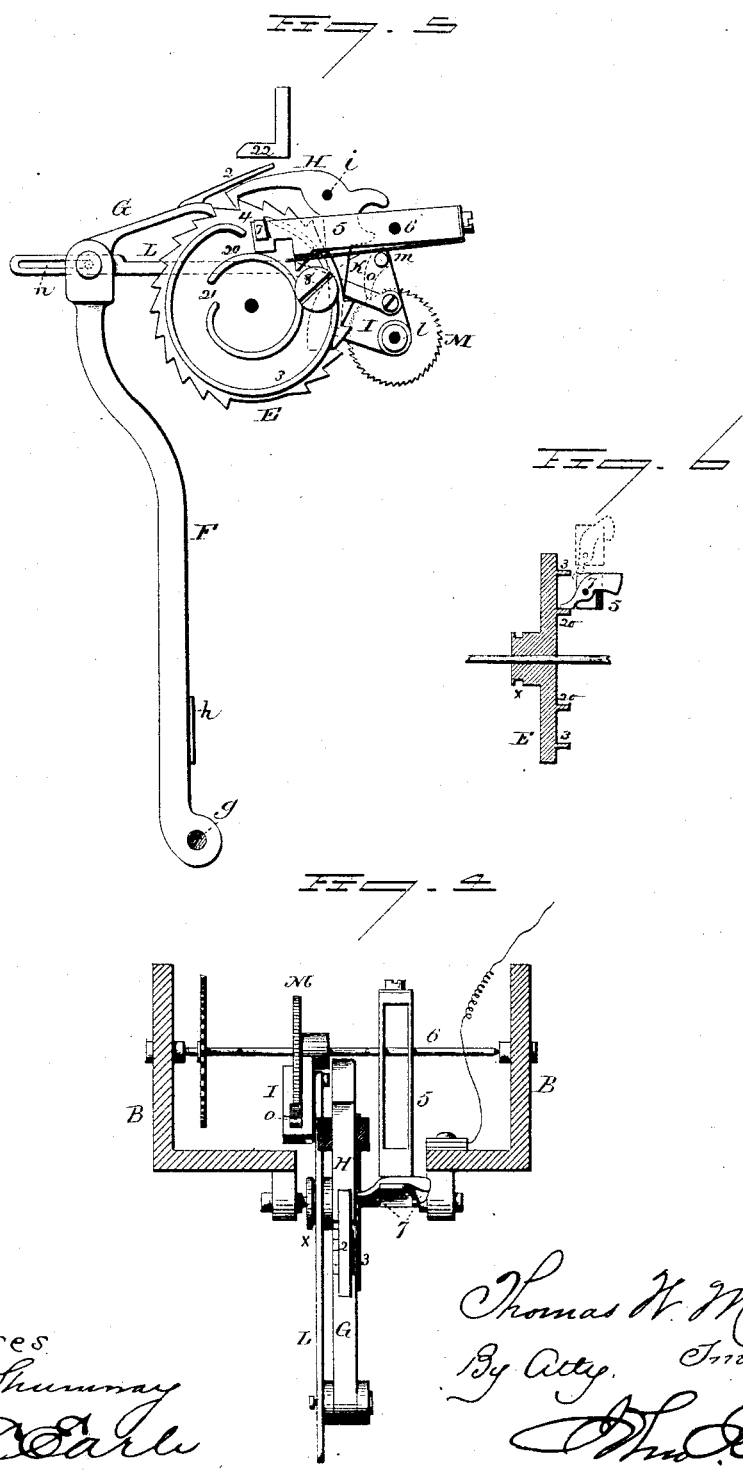

UNITED STATES PATENT OFFICE.

THOMAS WILLIAM MATHER, OF NEW HAVEN, CONNECTICUT.

STATION-CALL FOR ELECTRIC CIRCUITS.

SPECIFICATION forming part of Letters Patent No. 288,689, dated November 6, 1883.

Application filed August 13, 1883. (No model.)

*To all whom it may concern:*

Be it known that I, THOMAS W. MATHER, of New Haven, in the county of New Haven and State of Connecticut, have invented a new Improvement in Station-Calls for Electric Circuits; and I do hereby declare the following, when taken in connection with accompanying drawings and the letters of reference marked thereon, to be a full, clear, and exact description of the same, and which said drawings constitute part of this specification, and represent, in—

Figure 1, a front view; Fig. 2, a rear view; Fig. 3, a sectional side view; Fig. 4, a transverse sectional top view; Fig. 5, a sectional side view to illustrate the operation; Fig. 6, a vertical section through the count-wheel, looking to the rear, to illustrate the operation of the finger 7.

This invention relates to an improvement in station-calls for telephone and like circuits, the object of the invention being to construct a station-call which will operate only when the particular number of that station is required, all calls on the circuit being inoperative except the particular one which may be required; and the invention consists, principally, in a count-wheel having one or more recesses, according to the number of the station, and a lever operating in combination with the said wheel to fall into the said recess or recesses as the count-wheel shall be stopped, but the swinging movement of the lever being so slow that unless the count-wheel be stopped at the recess the count-wheel will readily pass the said lever without operation, the movement of the said lever serving to switch the current from the line to the bell when it is permitted to fall into the recesses; and in details of construction, as more fully hereinafter described.

A is the base on which the apparatus is set; B, the metallic case or frame within and upon which the mechanism is arranged. The current comes to the apparatus through a line secured to the post C, thence to the magnet D, and by a line, *a*, therefrom to the case of the machine. The outgoing line *b* is attached to an insulated post, *d*, from which a finger, *e*, extends and normally stands in contact with a lever, *f*, hung in the case to make the circuit through the frame of the machine.

E is the count-wheel, having any required number of teeth, and through which the movement is given to produce the call.

F is the armature-lever, hung below the magnet, as at *g*, and provided with the armature *h*, and carrying at its upper end a pawl, G, to work into the teeth of the count-wheel E. Each movement of the lever under the closing and breaking of the circuit, as seen in broken lines, Fig. 3, will cause the pawl to engage a corresponding tooth of the count-wheel and turn that wheel one point, the vibration of the lever F and the step-by-step turning of the count-wheel continuing so long as the closing and breaking of the circuit continues.

H is a dog arranged to engage the teeth of the count-wheel and hold the wheel as it is turned by the operation of the pawl G. This dog is hung upon a pivot, *i*. Normally this dog H is held out of engagement with the wheel by a weighted arm, I, hung loose upon a shaft, *l*. This arm carries a stud, *m*, which works against an arm, K, extending down from the dog, and as seen in Fig. 3. From this arm I a connecting-rod, L, extends forward into connection with the armature-lever F, and so that, as the lever F is drawn to the magnet in closing the circuit, the arm I will be turned from the position seen in Fig. 3 to that seen in Fig. 5, and which removes the stud *m* from the arm K of the dog and permits the dog to fall into engagement with its tooth of the wheel, as seen in Fig. 5.

In order that the weighted arm I may not return instantly upon the breaking of the circuit, as the lever F will do, the connecting-rod L is constructed with a slot, *n*, so as to permit the lever F to fall back independent of the arm I, and then that arm I may return slowly. A pawl, *o*, is hung to the arm I, and works into a toothed wheel, M, on the shaft *l*, and so that as the arm I is moved backward on closing the circuit the pawl *o* will escape the teeth of the wheel, but engage therewith at the termination of its rear movement. Then the weight of the arm I is applied to the shaft *l* through the wheel M. On the shaft *l* is a gear, N, working into a pinion, P, on a second shaft, R, and on this shaft R is a gear, S, which works into a pinion, T, on a third shaft, U. This third shaft carries a flier, W. Now, as the weight of the arm I is applied to its shaft *l*, to cause it to turn as the arm returns, that return movement imparts a rotation to the flier, and so far exhausts the power of the weight as to make the return of the arm I so slow that the dog H is permitted to engage each tooth of the wheel under ordinary breaking and closing of the circuit; but if the circuit be broken a sufficient length of time to permit the arm I to return under its slow movement, it will act upon the dog H, to disengage it from the count-wheel E—as, for illustration, suppose the circuit to be closed and broken four times, the count-wheel will be turned four teeth, and each tooth successively caught by the dog, because the force of the arm I is removed at the first closing; but at the expiration of the fourth break, if the break be continued, the dog will be disengaged, as before described. To the count-wheel a spring, weight, or other device is applied, to return the wheel when it shall be free from the action of the dog. In the illustration, this power is represented as a helical spring, r, from which a cord, t, extends to a drum, x, on the count-wheel. (See Fig. 1.) Then, so soon as the count-wheeel shall have been released from the action of the dog H, as before described, the power of the spring will at once return the wheel. As the dog rises from engagement with the wheel, it strikes an arm, 2, on the pawl, and raises the pawl, as seen in Fig. 3, to a position out of engagement with the tooth of the wheel, to permit the return of the count-wheel, as before described. This arm 2 would hold the pawl from possible engagement with the wheel were it not that as soon as the armature-lever begins its movement the arm I is turned away from its influence upon the dog H, so that both the dog H and the pawl G are permitted to drop into ingagement with the teeth of the wheel. On one side of the count-wheel is a concentric flange, 3, in which at one point is a recess, 4. Above this flange a lever, 5, is hung upon a shaft, 6, the forward arm of the lever being heavier than the rear arm, so that considerable weight is applied to the forward end of the arm, the tendency of which is to turn it toward the flange 3 on the count-wheel. At the forward end of this lever is a finger, 7, its point standing directly over the flange 3 on the count-wheel. This finger is hinged so that, while it stands firm against an upward pressure, it will readily turn downward upon pressure from above, as seen in broken lines, Fig. 6, its opposite end weighted or provided with a spring to turn it to its normal position.

On the wheel G is a stud, 8, upon which the under edge of the lever 5 rests when the parts are in their normal condition, as seen in Fig. 3, and thus holds the forward end of the lever considerably above the flange 3 on the count-wheel; but as the wheel is turned by the operation of the armature-lever, as before described, the stud 8 passes from beneath the lever and permits its forward end to descend toward the flange, and if permitted to continue its descent the finger 7 will strike upon the surface of the flange and ride thereon until the recess 4 in the flange arrives at a position beneath the finger. Then the lever will continue its descent, the finger passing through the recess 4. This recess 4 is in a position on the wheel with relation to the finger according to the number of the station. Suppose, for illustration, the number to be four, four times closing and breaking the circuit will turn the count-wheel four points, and at that time will bring the recess 4 directly beneath the finger and permit it to descend therein. In such descent of the forward end of the lever it strikes an arm, 9, on the lever f, and turns that lever from its connection with the finger e into connection with a second finger, 10. From this finger 10 a line, 11, leads to the bell. This turning of the lever f from the finger e to the finger 10 switches the current from the main line b to the bell-line 11, and will hold the switch in that connection so long as the lever remains down, and the bell will be sounded during that time; but when the break of the circuit is continued, to permit the arm I to operate, as before described, to release the count-wheel E, the count-wheel is returned by the action of the spring r, as before described, and, in so returning, the flange 3 passes over finger 7 until the stud 8 comes against the under side of the lever. Then the lever will be raised, the finger turning, as seen in broken lines, Fig. 6, to permit it to escape from the flange, and on such rise of the lever 5 the lever f will be turned from the bell-line to the main line by means of a counterbalancing-weight 12 thereon; or it may be a spring. In case the station be a number greater than that thus indicated, it is necessary that the recess 4 in the flange should pass the finger on the lever without permitting the lever to drop, and thereby avoid the signal at this station. To accomplish this object I place a gear, 13, on the shaft 6 of the lever 5, which works into a pinion, 14, on a second shaft, 15, and on this second shaft is a gear, 16, which works into a pinion, 17, on a shaft, 18, and on this shaft 18 is a flier, 19, and so that the returning of the shaft 6 imparts rotation to the flier, and the resistance applied by this flier causes the descent of the lever 5 to be so slow that unless the count-wheel be stopped for a suitable time while the recess 4 is below the finger the recess will have passed beyond the point where the finger may enter it before the finger can so enter, and hence will prevent the switching at this station—that is to say, the number of the station being four, four regular closings and breakings of the circuit will turn the wheel to the position required for the signal at this station; but if at another station the signal be, say, five, five regular closings and breakings will turn the count-wheel of this station to a point beyond which the switching can take place, and no effect will be here produced; but the count-wheel at the station five having its recess at five, the switching to the bell will be made and the signal given, but at no other on the circuit, it being understood that each station has its particular count-wheel.

It is often necessary that two or more numbers shall be employed to indicate the station. To do this—say for two numbers—a second flange, 20, is arranged upon the face of the wheel within the first flange, and in this flange a like recess, 21, is made, and so that when the first number—say four—is made by correspondingly closing and breaking the circuit, and there resting, the lever will drop through the first recess to bring it onto the second flange, and then a continued closing and breaking—say six—will bring the second recess 21, beneath the finger, and the finger will pass in through that recess, the switching not taking place until the lever has been brought to its lowest point, and so if three or more numbers are required corresponding flanges with recesses will be arranged. In case of two stations having the same first number—as, say, four—the lever of those two stations would pass through the first recess; but the second recess being at a different position, the switching would take place only at that station which stopped the wheel at its counting-point. To prevent a possible mistake in the count—that is, the throwing of the count-wheel too far—I arrange a shoulder, 22, above the dog H, and so that as the pawl advances from the position seen in Fig. 3 into engagement with the next tooth of the wheel, as seen in broken lines, Fig. 3, the arm 2 will pass into a position beneath the shoulder 22 so close to the shoulder that the pawl cannot escape its tooth, and then, passing on still farther to the position seen in Fig. 5, it produces the turning of the wheel. The arm 2, still held by the shoulder 22, also holds the dog from possible escapement from its wheel. In case of a single number, the count-wheel, instead of having a flange, as described, may be a disk with a notch in its periphery; but in case of more than one number, the concentric flanges are preferable. By this construction each station may have its own particular signal, and it can only be given when that particular number is called.

The apparatus for different stations only requires that the count-wheel shall be varied, the remainder of the apparatus being the same.

Instead of making the stud 8 on the count-wheel, it may be a separate cam on the same shaft, the stud acting upon the lever as a cam.

While I prefer to arrange a switch which shall turn the circuit from the line to the bell, and the said switch to be operated by the count-wheel lever, the signal or call may be made without switching—as, for illustration, a bell may be attached near the instrument, and the hammer arranged to be operated by the count-wheel lever during its descent into the recess in the count-wheel, but so that the hammer is not operated upon unless the lever does enter the recess in the count-wheel of that station. I therefore do not wish to limit my invention to the use of a switch.

I claim—

1. In a station-call for electric circuits, the combination of a magnet, armature-lever, a count-wheel, a pawl on said lever working into the teeth of the count-wheel, whereby an intermittent rotation will be imparted to said count-wheel, said count-wheel constructed with a recess corresponding to the number of the station, a lever arranged to fall into said recess when the count-wheel shall have been turned to the position indicating that station, but so as to escape said recess when a greater number is called, and mechanism, substantially such as described, to return said count-wheel and lever after the call, substantially as described.

2. In a station-call for electric circuits, the combination of a magnet, armature-lever, a count-wheel, a pawl on said lever working into the teeth of the count-wheel, whereby an intermittent rotation will be imparted to said count-wheel, said count-wheel constructed with a recess corresponding to the number of the station, a lever arranged to fall into said recess when the count-wheel shall have been turned to the position indicating that station, but so as to escape said recess when a greater number is called, and mechanism, substantially such as described, to return said count-wheel and lever after the call, and a switch arranged to be operated by said lever as it falls into the recess in the count-wheel, substantially as described.

3. The combination of the magnet D, armature-lever F, count-wheel E, pawl G, the said count-wheel provided with one or more flanges, with a recess therein corresponding to the number of the station, the lever 5, and mechanism, substantially such as described, to return said count-wheel and lever, finger 7, hinged at the forward end of the lever, and a cam revolving with the count-wheel, arranged to throw said lever from said count-wheel as said count-wheel returns to its normal position, and a switch arranged to be operated by said lever as it falls into the recess in the count-wheel, substantially as described.

4. The combination of the magnet D, armature-lever F, count-wheel E, constructed with a recess corresponding to the number of the station, the pawl G, lever 5, and mechanism, substantially such as described, to return said count-wheel and lever, the dog H, weighted arm I, in connection with the armature-lever, and whereby said dog will be permitted to engage the count-wheel at each step, but thrown from its engagement to permit the return of the count-wheel, and a switch arranged to be operated by said lever as it falls into the recess in the count-wheel, substantially as described.

5. The combination of the magnet D, armature-lever F, count-wheel E, constructed with a recess corresponding to the number of the station, the pawl G, lever 5, and mechanism, substantially such as described, to return said count-wheel and lever, the dog H, the weighted arm I, in connection with the armature-lever, and whereby said dog will be permitted to engage the count-wheel at each step, but thrown from its engagement to permit the return of the count-wheel, mechanism, substantially such as described, to make a slow return of the arm I, and a switch arranged to be operated by said lever as it falls into the recess in the count-wheel, substantially as described.

6. The combination of the magnet D, armature-lever F, count-wheel E, constructed with a recess corresponding to the number of the station, the pawl G, lever 5, and mechanism, substantially such as described, to return the count-wheel and lever, and mechanism, substantially such as described, to cause a slow descent of the lever, and a switch arranged to be operated by said lever as it falls into the recess in the count-wheel, substantially as described.

7. The combination of the magnet D, armature-lever F, count-wheel E, lever 5, dog H, and pawl G, the said pawl constructed with an arm, 2, extending over the dog, and a switch arranged to be operated by said lever as it falls into the recess in the count-wheel, substantially as described.

8. The combination of the magnet D, armature-lever F, count-wheel E, lever 5, dog H, and pawl G, the said pawl constructed with an arm, 2, extending forward of the dog, with a shoulder, 22, and a switch arranged to be operated by said lever as it falls into the recess in the count-wheel, substantially as described.

THOMAS WM. MATHER.

Witnesses:
JOHN E. EARLE,
JOS. C. EARLE.